Patented June 18, 1935

2,004,956

UNITED STATES PATENT OFFICE 2,004,956

PLASTIC COMPOSITION

John J. Martin, Brooklyn, N. Y., assignor to Bell Telephone Laboratories, Incorporated, New York, N. Y., a corporation of New York No Drawing. Application January 29, 1932, Serial No. 589,771

6 Claims. (Cl. 106—22)

This invention relates to plastic compositions and particularly to such a composition which has superior electrical and physical characteristics and is relatively unaffected by moisture.

Plastic compositions such, for example, as phenol resins, cellulose acetate, cellulose nitrate, urea, etc., either with or without a finely ground filler such as wood flour are now being used extensively because of their superior electrical characteristics and because of the fact that they present a good appearance and can be molded readily. However, for many uses, these materials do not have the desired physical properties since their tensile strength is low and they can not withstand impacts without cracking or shattering. To overcome these difficulties it has been proposed to reinforce certain of these plastic materials by the addition of small pieces of fabric or textile threads. It has been found that in this way the physical properties can be greatly improved, but the finish of the resulting product quickly loses its lustre when exposed to humid conditions, giving it an appearance as though the fabric or threads were brought to the surface of the material. Furthermore, the addition of the fabric or thread filling material increases the molding difficulties necessitating working at much higher pressures and thus slowing down production.

An object of the present invention, therefore, is an improved plastic composition having superior mechanical and electrical properties.

A further object of the invention is a plastic composition having superior mechanical and electrical properties and also capable of retaining a finish of high quality even when exposed to severe conditions of humidity. A still further object of the invention is to obtain all these properties in a material which can be economically molded.

To attain these objects and in accordance with a feature of the invention, small pieces of fabric or short threads of a fibrous cellulose ester or ether are employed as reinforcing members in a plastic composition such as phenol resin, cellulose acetate, urea or the like. The partial esterification or etherification of the cellulose improves the electrical properties of the material and makes it highly repellant to moisture and the process is not allowed to proceed to a point where the physical characteristics of the individual fibres are impaired. The incorporation of partially esterified or etherified cellulose in a molding mixture in the place of the cotton fabric used heretofore produces a composition which is far more water-resistant and, therefore, one which has a greatly increased insulation resistance. Furthermore, the finish of the molded material is one of high lustre and this lustre is maintained even when subjected to conditions of high humidity.

In the preferred embodiment of the invention the cellulose material is converted into a cellulose acetate ester but other cellulose esters may be employed with satisfactory results, such for example, as the propinate, butyrate and the formate. Also under certain conditions it is possible to use a cellulose ether such as cellulose benzylate. When a cellulose ester such as cellulose acetate is employed the best results are obtained when the acetylation process is stopped when the acetyl value is not greater than 30%, at which time the material consists chiefly of cellulose mono-acetate and cellulose di-acetate, the theoretical acetyl values of which are 21.1% and 34.9%, respectively. The partially acetylated cellulose brings about a decided improvement in the molding process since this material flows more freely in the mold than do the materials used heretofore and hence can be molded at lower pressures.

In the preferred method of preparing the fibrous cellulose acetate filler, the cotton or other fibrous material is first alkali-boiled and then subjected to a bleaching process which permits more uniform acetylation. Particularly good results have been obtained when the following process has been employed prior to acetylation:

(1) Heat 2½ parts of cotton with 40 parts by weight of 1½% to 2% caustic soda solution for 1 to 4 hours at approximately 300° F. in the absence of air.

(2) Wash free from alkali with water.

(3) Bleach for 2 hours with 50 parts of a .1% calcium hypochlorite solution (35% available chlorine) by weight at room temperature (60 to 85° F.).

(4) Wash well.

(5) Treat for 1 hour with 50 parts of water containing .02% parts of concentrated sulphuric acid, to destroy traces of the hypochlorite.

(6) Wash.

(7) Allow to stand 1 hour at room temperature in 40 parts water containing .01 part sodium bisulfite ($Na_2HSO_3$) to effect dechlorination.

(8) Wash.

(9) Dry quickly at room temperature (120° F.).

The bleached material is next acetylated to yield a product varying in acetyl value up to about 30% depending upon the variation in the time of acetylation and the temperature and composition of the acetylating bath. In general, the most desirable results both electrically and mechanically are obtained when the acetylation process is not carried beyond the stage where the material is converted into mono-acetate the theoretical acetyl value of which is 21.1% but good results are obtained when the product consists largely of di-acetate, the actyl value of which is 34.9%, or a combination of mono-acetate and di-acetate. If the acetylation is carried beyond the di-acetate stage destruction of the fibres occurs to such an extent that the mechanical strength of the product is decreased and it is much less satisfactory. Furthermore, the mono-acetate and di-acetate are insoluble in ordinary organic solvents such as acetone, chloroform, benzene, the alcohols and also the acetylating mixture itself.

A typical example of the acetylating process and one which has been found to give particularly good results is as follows: The bleached cotton yarn is immersed in 8.8 times its weight of acetylating mixture which contains 4 parts commercial glacial acetic acid, 4 parts commercial acetic anhydride (90 to 95%) and .8 part commercial anhydrous zinc chloride, for 7 hours at 25° C. The excess acid is removed by wringing or centrifuging and the cotton is immersed in or flooded with a large volume of water, washed acid free, and dried. The material obtained by following this process has an acetyl value of about 17%. It is necessary to control the temperature within very narrow limits as, for example, 60/2 yarn acetylated under the same conditions as described above at various temperature yields the following acetyl values:

| Temperature—degrees C. | Acetyl values |
|---|---|
| 22 | 12 |
| 24 | 16 |
| 26 | 18 |
| 28 | 22 |
| 30 | 26 |

While cotton has been cited as an example and it is believed that this material lends itself most readily for use in preparing the fabric filler, the process may also be employed on other cellulose materials such, for example, as flax, ramie, hemp, artificial silk which has been regenerated such as rayon, etc., the essential feature being to insure that the acetylating process is not carried beyond the di-acetate stage and preferably not beyond the mono-acetate stage.

After the cellulosic material has been purified and partially acetylated it is preferably woven into a fabric and then impregnated with a thermo-plastic binder such, for example, as a phenol resin or a solution of cellulose acetate. Other thermo-plastic binders such as urea, cellulose nitrate, etc., may be used if desired. The term "thermo-plastic", is here used to include binders such as phenol resins and the ureas, which more strictly speaking, are thermo-setting, as well as materials such as cellulose acetate which softens upon the application of heat. Also instead of impregnating the material the binder may be incorporated with the fabric by employing a powdered binder and mixing it with the partially acetylated cellulose on the rolls of a mixing mill. Preferably the binder is incorporated by following the impregnating process, in which case the impregnated material is dried at a low temperature which will not cause a chemical change in the character of the binder employed. The dried, impregnated material is then shredded, chopped or otherwise subdivided to provide a flocculent mass of long partially acetylated cellulose fibres which are uniformly impregnated with the binder. This flocculent material can be readily molded in irregular shaped molds by employing suitable temperatures and pressures. When employing a phenol resin as the binding material, a satisfactory process of molding consists in first heating the mold to approximately 200° F. The mold is then charged with the molding material and subjected to a temperature such as to bring its temperature to approximately 275° F. The pressure is increased slowly until the mold closes, after which the temperature is increased to approximately 350° F. and the pressure on the mold increased to the point necessary to insure proper flow of the material in the mold and proper curing. When using a filler of partially acetylated cellulose, this pressure will ordinarily vary from 1500 pounds to 5000 pounds per square inch, depending upon the plasticity of the particular phenol resin binder used. The time required for curing while maintaining the mold at a temperature of 350° F. varies roughly from several minutes to one hour, depending upon the size of the sample.

When employing other binders it is, of course, necessary to change the temperatures and pressures employed, depending upon the nature of the particular binder being used. In the case of a binder consisting of cellulose tri-acetate there is an additional advantage in that the binder and filler are both forms of cellulose acetate and are therefore intimately bonded together. Furthermore, when it is desired to color such a composition the dyeing material effects filler and binder equally, thereby giving a uniform color.

It is preferable, as pointed out above, that the filler consisting of partially acetylated cotton commingled with the binder be in the form of small pieces of fabric. However, under certain conditions, it is possible to dispense with the step of weaving the cotton into a fabric and employ small lengths of cotton yarn or thread which has been partially acetylated in the manner described and then commingled with a suitable binder as by impregnation or mixing with a binder in powdered form.

What is claimed is:

1. The method of forming a plastic composition from cotton in the form of threads which consists in partially esterifying the cotton threads without altering the physical structure of their individual fibers, commingling the esterified threads with a thermoplastic binder, reducing said threads to small lengths, placing said lengths of thread in a mold and subjecting to heat and pressure.

2. The method of forming a plastic composition from cotton in the form of threads which consists in partially acetylating the cotton threads without altering the physical structure of their individual fibers, weaving said acetylated thread into a fabric, impregnating the fabric with a thermoplastic binder, dividing said impregnating fabric into small pieces, placing said pieces in a mold and subjecting to heat and pressure.

3. The method of forming a plastic composition from cotton in the form of threads which consists in partially acetylating the cotton threads without altering the physical structure of their individual fibers, commingling the acetylated threads with a phenol resin binder, reducing said threads to small lengths, placing said small lengths in a mold and subjecting to heat and pressure.

4. The method of forming a plastic composition from cotton in the form of threads which consists in partially acetylating the cotton threads without altering the physical structure of their individual fibers, commingling the acetylated threads with a binder solution of cellulose acetate, reducing said threads to small lengths, placing said small lengths in a mold and subjecting to heat and pressure.

5. A molding composition comprising small lengths of partially acetylated cotton threads commingled with a thermoplastic binder.

6. A molding composition comprising small pieces of fabric consisting of woven threads of partially acetylated cotton and a thermoplastic binder commingled therewith.

JOHN J. MARTIN.